(12) United States Patent
Mori et al.

(10) Patent No.: US 7,254,466 B2
(45) Date of Patent: Aug. 7, 2007

(54) ENGINE START CONTROLLER

(75) Inventors: Hiroshi Mori, Aichi (JP); Toru Maeda, Aichi (JP); Yuji Fukano, Aichi (JP); Tomoo Kakegawa, Aichi-ken (JP); Tomoyuki Funayama, Toyota (JP); Takashi Yanatsubo, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/901,479

(22) Filed: Jul. 27, 2004

(65) Prior Publication Data

US 2005/0029871 A1  Feb. 10, 2005

(30) Foreign Application Priority Data

Aug. 8, 2003  (JP)  ............... 2003-206836

(51) Int. Cl.
*H04Q 9/04* (2006.01)
*H04Q 1/00* (2006.01)

(52) U.S. Cl. ......................... 701/1; 340/10.4
(58) Field of Classification Search .................... 701/1; 307/10.1, 10.2, 10.3, 10.6; 70/237, 252; 340/10.4, 10.5, 10.6; 180/287; 123/179.1, 123/179.2, 179.3
See application file for complete search history.

(56) References Cited

U.S. PATENT DOCUMENTS 4,638,882 A * 1/1987 Sato ........................ 180/287
4,688,036 A * 8/1987 Hirano et al. ............... 340/5.62
4,761,645 A * 8/1988 Mochida .................... 340/5.62
5,036,687 A * 8/1991 Takeuchi et al. ............ 70/186
5,641,999 A * 6/1997 Kawashima ............... 307/10.3
5,977,655 A * 11/1999 Anzai ....................... 307/10.3
6,351,206 B1   2/2002 Schweiger et al.
6,354,120 B1 * 3/2002 Tan et al. ................... 70/252

FOREIGN PATENT DOCUMENTS

| EP | 0 604 981 A2 | 7/1994 |
| EP | 1 072 487 A1 | 1/2001 |
| FR | 2 810 776 A3 | 12/2001 |
| JP | 2002-317689 | 10/2002 |

* cited by examiner

*Primary Examiner*—Dalena Tran
(74) *Attorney, Agent, or Firm*—Crompton, Seager & Tufte, LLC

(57) ABSTRACT

An engine start controller shortens the time required from when an operation switch is operated to when an engine is started. The engine start controller controls starting of the engine of a vehicle and power supply to an electric device system. A control unit selectively locks the steering shaft of the vehicle and performs authentication with a portable device, which is carried by a user of the vehicle, for permitting use of the vehicle. An operation switch is connected to the control unit and generates an operation signal when operated by the user. The control unit unlocks the steering shaft in parallel with supplying power to the electric device system when the operation signal is generated and use of the vehicle is permitted through the authentication.

12 Claims, 7 Drawing Sheets

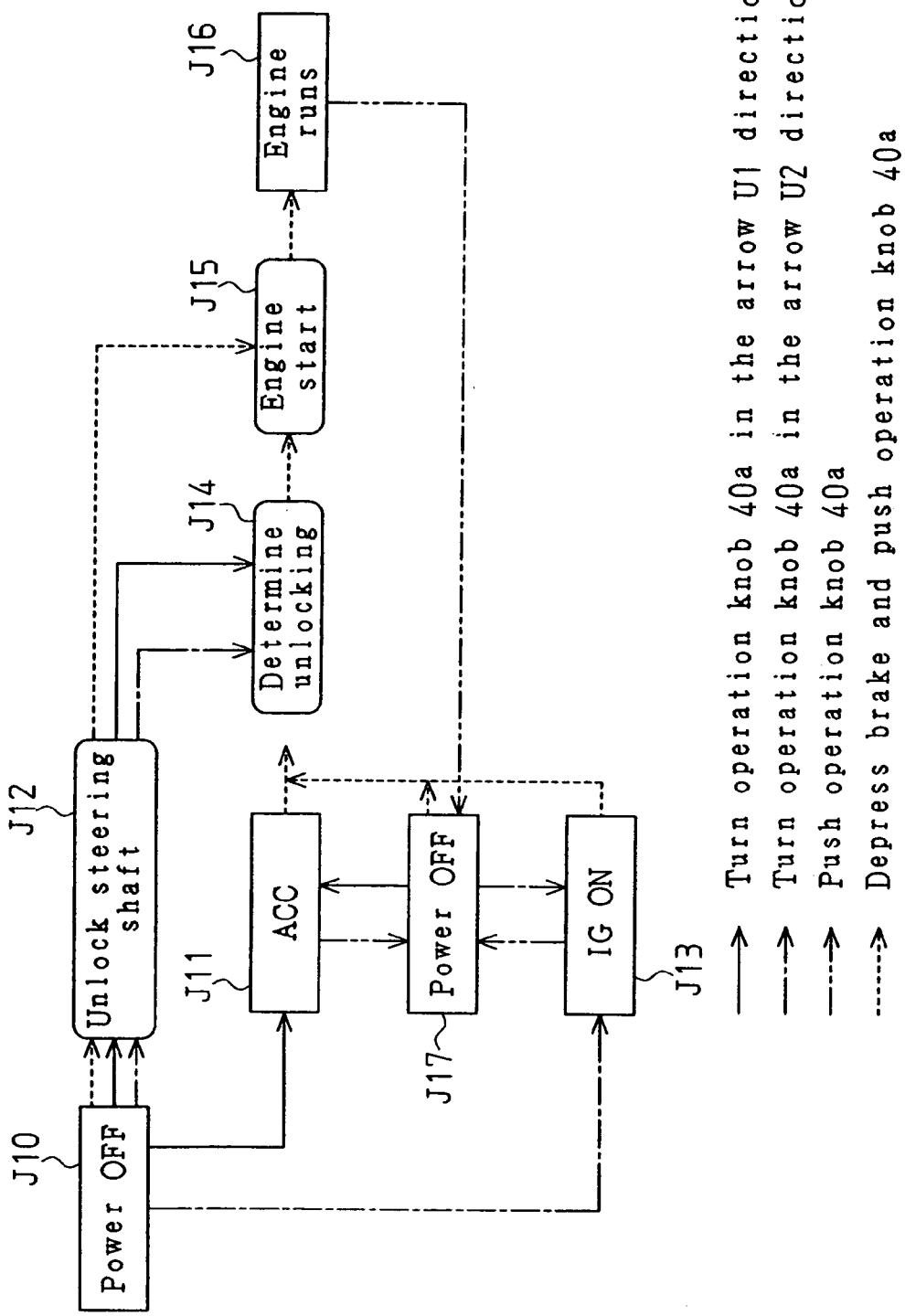

ENGINE START CONTROLLER

BACKGROUND OF THE INVENTION

The present invention relates to a controller, and more particularly, to an engine start controller provided with a smart ignition function.

In recent years, engine start/stop control systems provided with a "smart ignition" function for controlling starting and stopping of an engine have been proposed to improve the operability of vehicles. Japanese Laid-Open Patent Publication No. 2002-317689 describes an example of such an engine start/stop control system. In this engine start/stop control system, when an owner (driver) carrying a portable device enters a passenger compartment of a vehicle, the portable device automatically communicates with an engine start controller installed in the vehicle. When the communication authenticates that an ID of the portable device corresponds to an ID of the vehicle, the engine start controller permits starting of the engine.

To prevent vehicle thefts, the vehicle has a steering lock mechanism. The steering lock mechanism prevents the vehicle from being stolen by restricting rotation of the steering shaft while the vehicle is parked. In the engine start/stop control system, the ID of the portable device is first authenticated through communication. Afterwards, the steering shaft is unlocked when the driver operates an operation switch, such as a push switch, arranged in the vicinity of the driver's seat in the vehicle.

The engine start controller switches power supply modes when the operation switch is operated. To be more specific, the engine start controller switches the power supply mode to one of a mode for supplying power to an accessory (ACC) system including electric components such as a car audio system (hereafter referred to as the "ACC system power supply mode"), a mode for supplying power to, in addition to the electric components, an ignition-on (IG-ON) system including the air conditioner and gauges in the instrument panel (hereafter referred to as the "IG-ON system power supply mode"), and a mode for cutting the supply of power to any of these electric device systems (hereafter referred to as the "power OFF mode").

For example, when the driver starts the engine using a mechanical key, the power supply mode is switched in the following way. First, the driver inserts the mechanical key in a key cylinder and turns the mechanical key. Then, the engine start controller unlocks the steering shaft and supplies power to the ACC system. Afterwards, when the driver further turns the mechanical key, the engine start controller supplies power to the IG-ON system. In this way, when the driver starts the engine with the mechanical key, the steering shaft is first unlocked. Afterwards, power is supplied to the ACC system and then to the IG-ON system. With reference to FIG. 1, the following describes the procedures performed by a conventional engine start controller in which the operation switch is operated, the system to which power is supplied (power supply system) is switched, and the engine is started. In FIG. 1, the rectangular blocks represent processes that require an operation of a user (driver) to proceed to the next process. The rectangular blocks with rounded corners represent processes that do not require an operation of a user (driver) to proceed to the next process.

In step J50, power is not supplied to the electric device systems (power OFF mode). In step J50, the engine start controller is set in a state in which the unlocking of the steering shaft is enabled (hereafter referred to as a "standby state") when the ID of the portable device is authenticated through communication between the portable device and the engine start controller. When the driver operates the operation switch in the standby state, the engine start controller unlocks the steering shaft (step J51). As shown in step J52, the engine start controller then determines whether the steering shaft is unlocked. When the steering shaft is unlocked, the engine start controller switches the power supply mode to the ACC system power supply mode (step J53). Afterwards, when the driver further operates the operation switch, the engine start controller switches the power supply mode to the IG-ON system power supply mode (step J54). Then, the driver depresses the brake pedal and operates the operation switch so that the engine start controller starts the engine (step J55). In this way, the engine is started only when the steering shaft is determined as being unlocked. Subsequently, the engine starts running as shown in step J56.

In step J54, when the driver operates the operation switch without depressing the brake pedal, the engine start controller does not supply power to the electric device systems (power OFF mode) (step J57). Thereafter, the engine start controller sequentially switches the power supply mode to the ACC system power supply mode (step J53), the IG-ON system power supply mode (step J54), the power OFF mode (step J57), and the ACC system power supply mode (step J53) every time the operation switch is operated. In this way, the engine start controller shifts only to the processing in one of steps J53, J54, and J57 when the brake pedal is not depressed. Thus, the driver needs to depress the brake pedal to start the engine.

In the power OFF mode in step J50, the driver depresses the brake pedal and also operates the operation switch. Then, the engine start controller unlocks the steering shaft, and determines that the steering shaft is unlocked (step J52). Afterwards, the engine start controller starts the engine (step J55) without entering the ACC system power supply mode (step J53) and the IG-ON system power supply mode (step J54). The engine start controller also starts the engine when the driver depresses the brake pedal and operates the operation switch in steps J53 (the ACC system power supply mode), J54 (the IG-ON system power supply mode), and J57 (the power OFF mode). In this way, the driver may start the engine by depressing the brake pedal and also operating the operation switch in any power supply mode.

When the driver operates the operation switch while the engine is running, the engine start controller stops the engine and switches the power supply mode to the power OFF mode (step J57).

As described above, a conventional engine start controller switches the power supply mode from the power OFF mode to the ACC system power supply mode after the steering shaft is unlocked. Thus, a long period of time is required from when the operation switch is operated to when the power supply mode is switched to the ACC system power supply mode. As a result, a long period of time is required from when the operation switch is operated to when the engine is started.

SUMMARY OF THE INVENTION

The present invention provides an engine start controller that shortens the time required from when an operation unit such as a switch is operated to when an engine is started.

One aspect of the present invention is a controller for controlling starting of an engine of a vehicle, including a steering shaft, by a user having a portable device, and for controlling power supply to an electric device system. The controller includes a control unit for selectively locking the steering shaft of the vehicle and performing authentication with the portable device to permit use of the vehicle. The portable device is carried by the user of the vehicle. An operation unit, connected to the control unit, generates an operation signal when operated by the user. The control unit unlocks the steering shaft in parallel with supplying power to the electric device system when the operation signal is generated and use of the vehicle is permitted through the authentication.

Another aspect of the present invention is a controller for controlling starting of an engine of a vehicle, including a steering shaft, by a user having a portable device, and for controlling power supply to an electric device system. The controller includes a lock mechanism for selectively locking the steering shaft of the vehicle. An authentication unit performs authentication with the portable device to permit use of the vehicle. The portable device is carried by the user of the vehicle. An operation unit generates an operation signal when operated by the user. A power supply control unit is connected to the lock mechanism, the authentication unit, and the operation unit. The power supply control unit controls the lock mechanism to unlock the steering shaft in parallel with supplying power to the electric device system when the operation signal is generated and use of the vehicle is permitted through the authentication.

A further aspect of the present invention is a method for controlling starting of an engine of a vehicle that communicates with a portable device. The vehicle includes a steering shaft that is selectively locked, an electric device system, and an operation unit that is operable by a user. The method includes performing authentication for permitting use of the vehicle through communication between the portable device and the vehicle, and unlocking the steering shaft in parallel with supplying power to the electric device system when the user operates the operation unit if use of the vehicle is permitted by said performing authentication for permitting use of the vehicle.

A further aspect of the present invention is a method for controlling starting of an engine of a vehicle that communicates with a portable device. The vehicle includes a steering shaft that is selectively locked, a plurality of electric device systems including a first electric device system, a second electric device system, and an engine control system, and an operation unit that is operable by a user in a plurality of modes including a first mode, a second mode, and a third mode. The method including performing authentication for permitting use of the vehicle through communication between the portable device and the vehicle, unlocking the steering shaft in parallel with supplying power to the first electric device system when the user operates the operation unit in the first mode if use of the vehicle is permitted by said performing authentication for permitting use of the vehicle, unlocking the steering shaft in parallel with supplying power to the second electric device system when the user operates the operation unit in the second mode if use of the vehicle is permitted by said performing authentication for permitting use of the vehicle, and unlocking the steering shaft in parallel with supplying power to the engine control system when the user operates the operation unit in the third mode if use of the vehicle is permitted by said performing authentication for permitting use of the vehicle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a flowchart illustrating the operation of an engine start controller shown in FIG. 5.

DETAILED DESCRIPTION OF THE PREFERRED EMBODIMENTS

Figure 1:
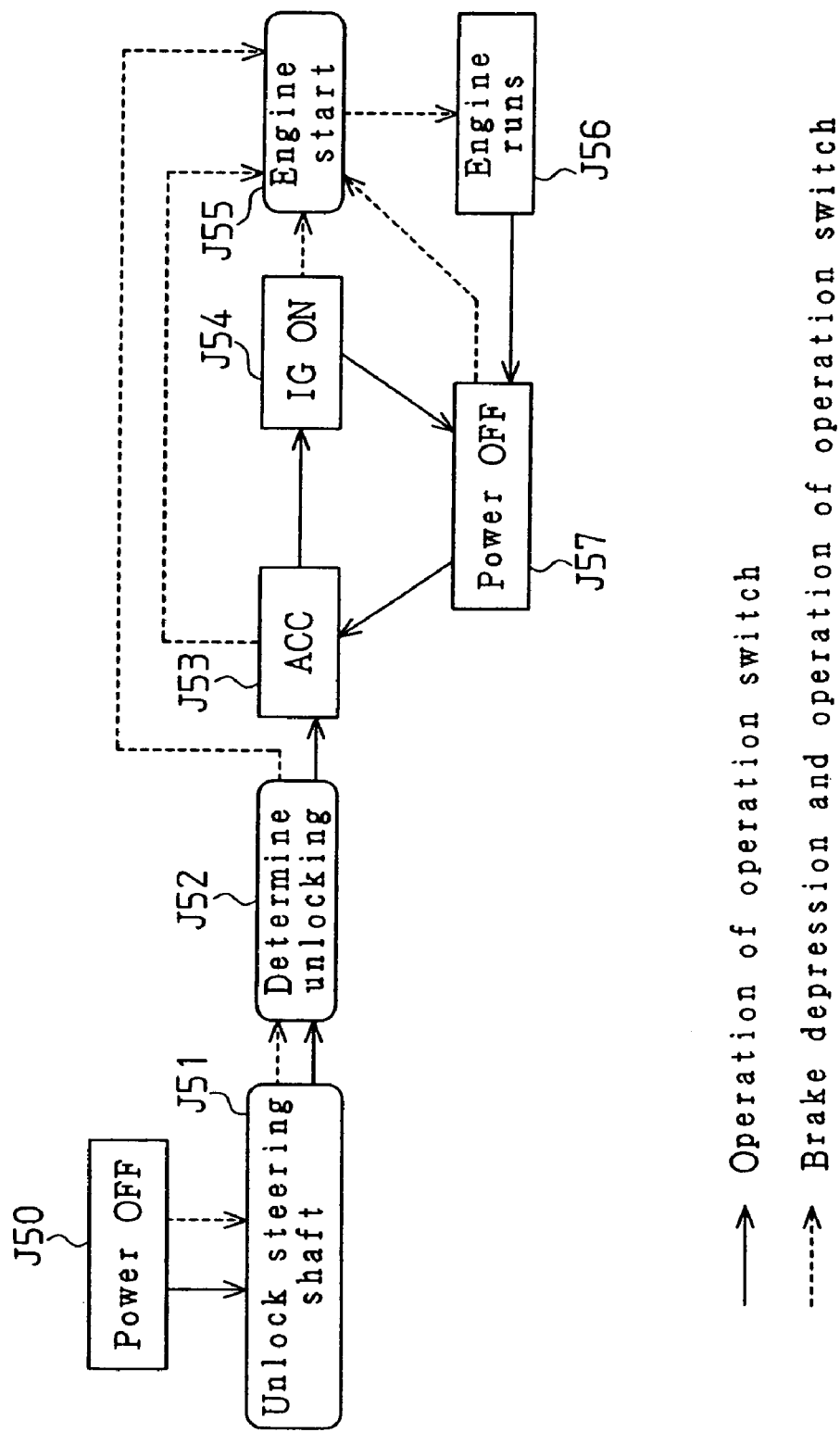
FIG. 1 is a flowchart showing the operation of an engine start controller in the prior art.

In the drawings, like numerals are used for like elements throughout.

First Embodiment

Figure 2:
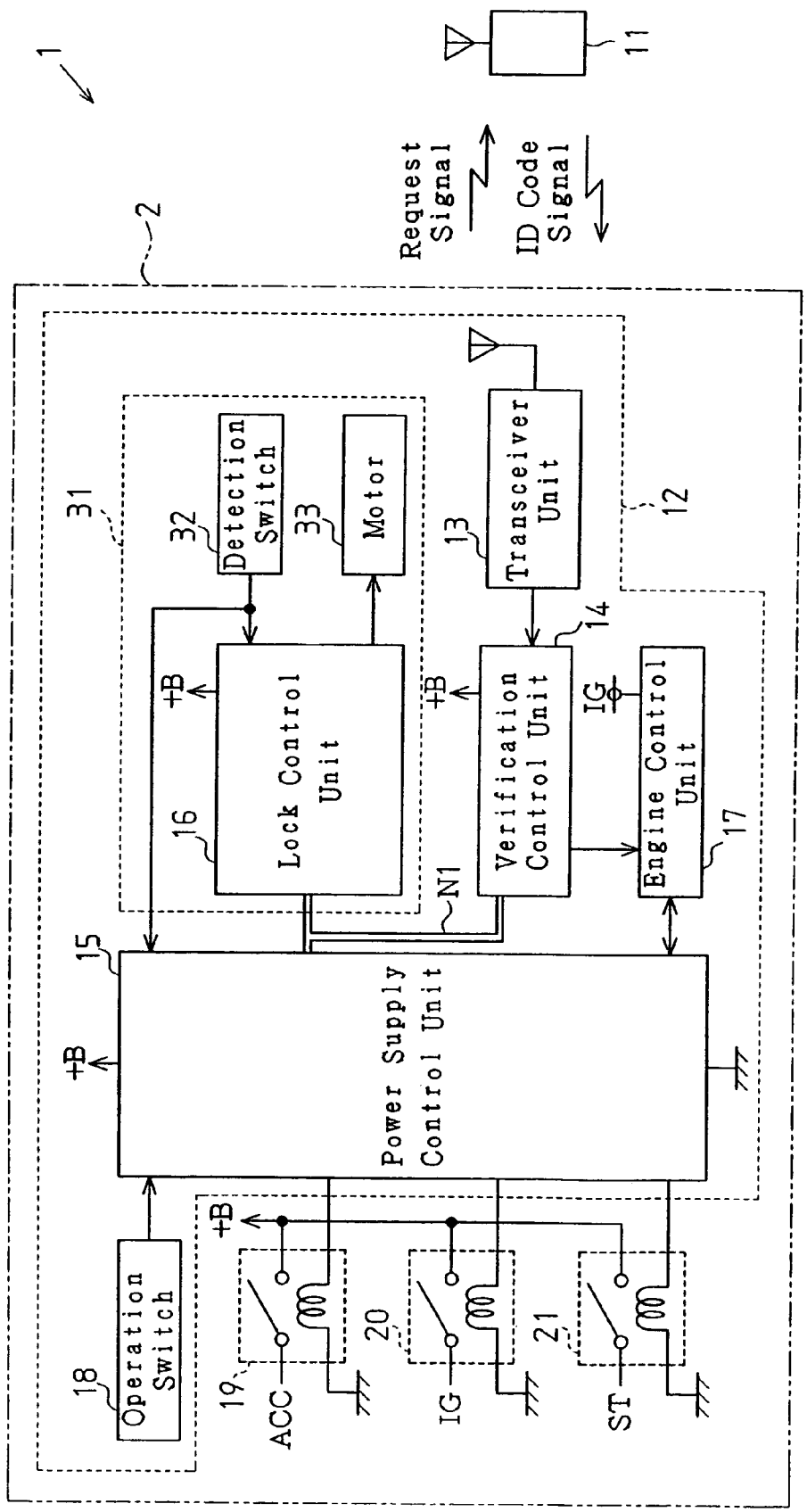
FIG. 2 is a schematic block diagram of an engine start/stop control system according to a first embodiment of the present invention.
Figure 3A:
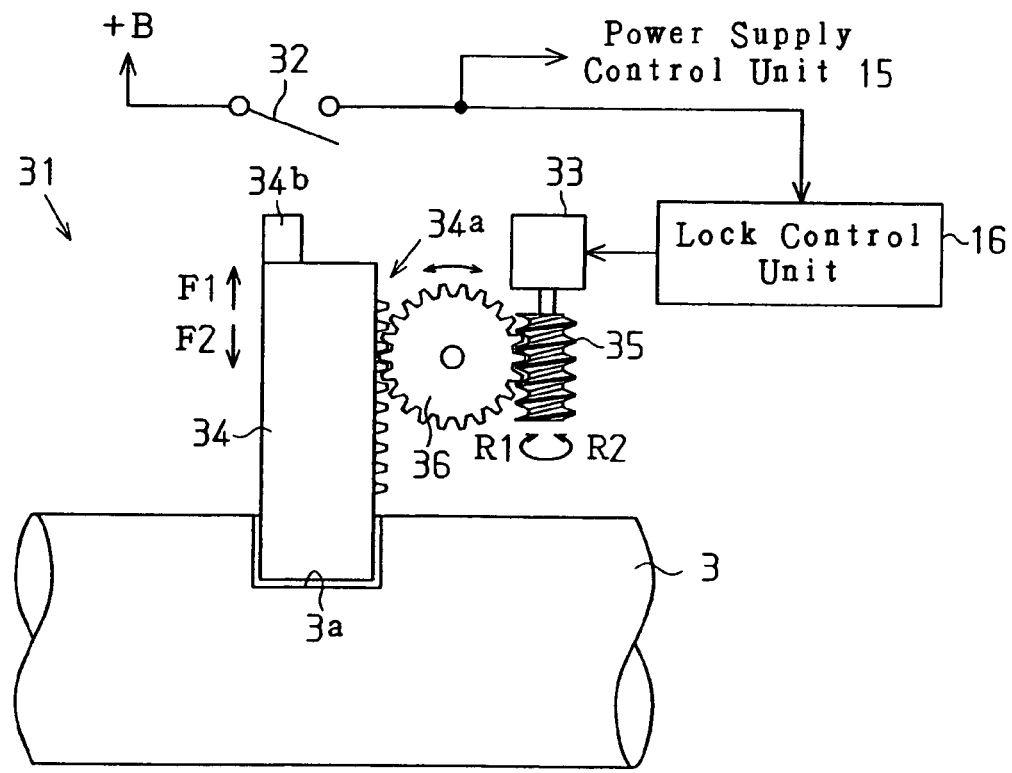
FIGS. 3A and 3B are schematic diagrams illustrating the operation of a steering lock mechanism shown in FIG. 2.
Figure 3B:
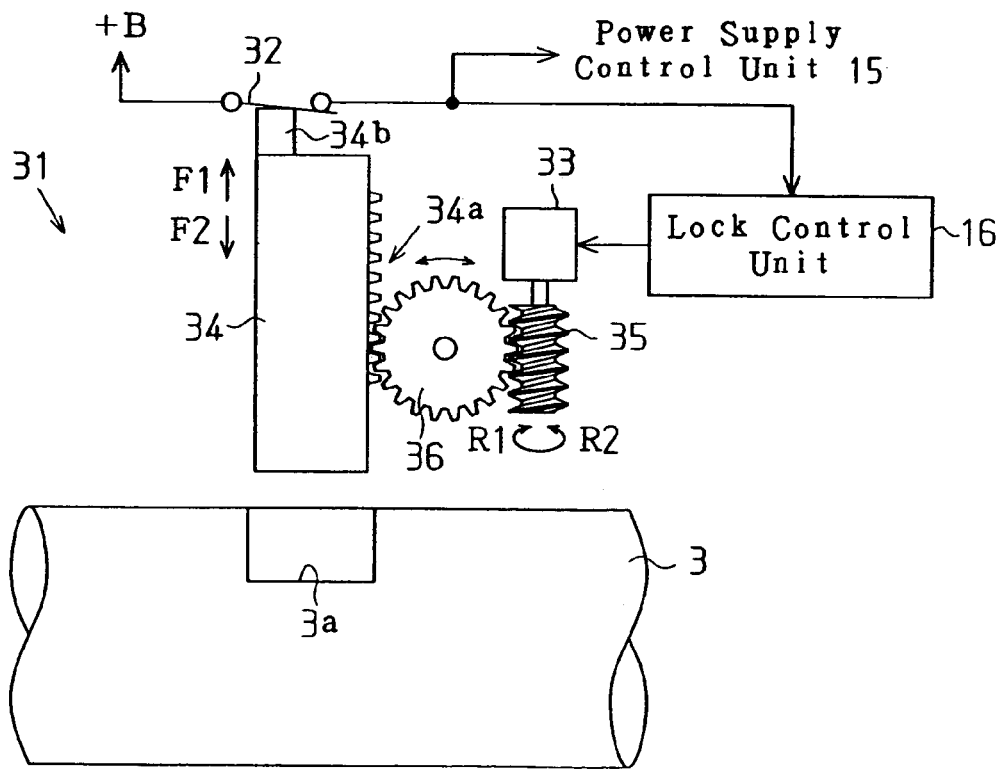
Figure 4:
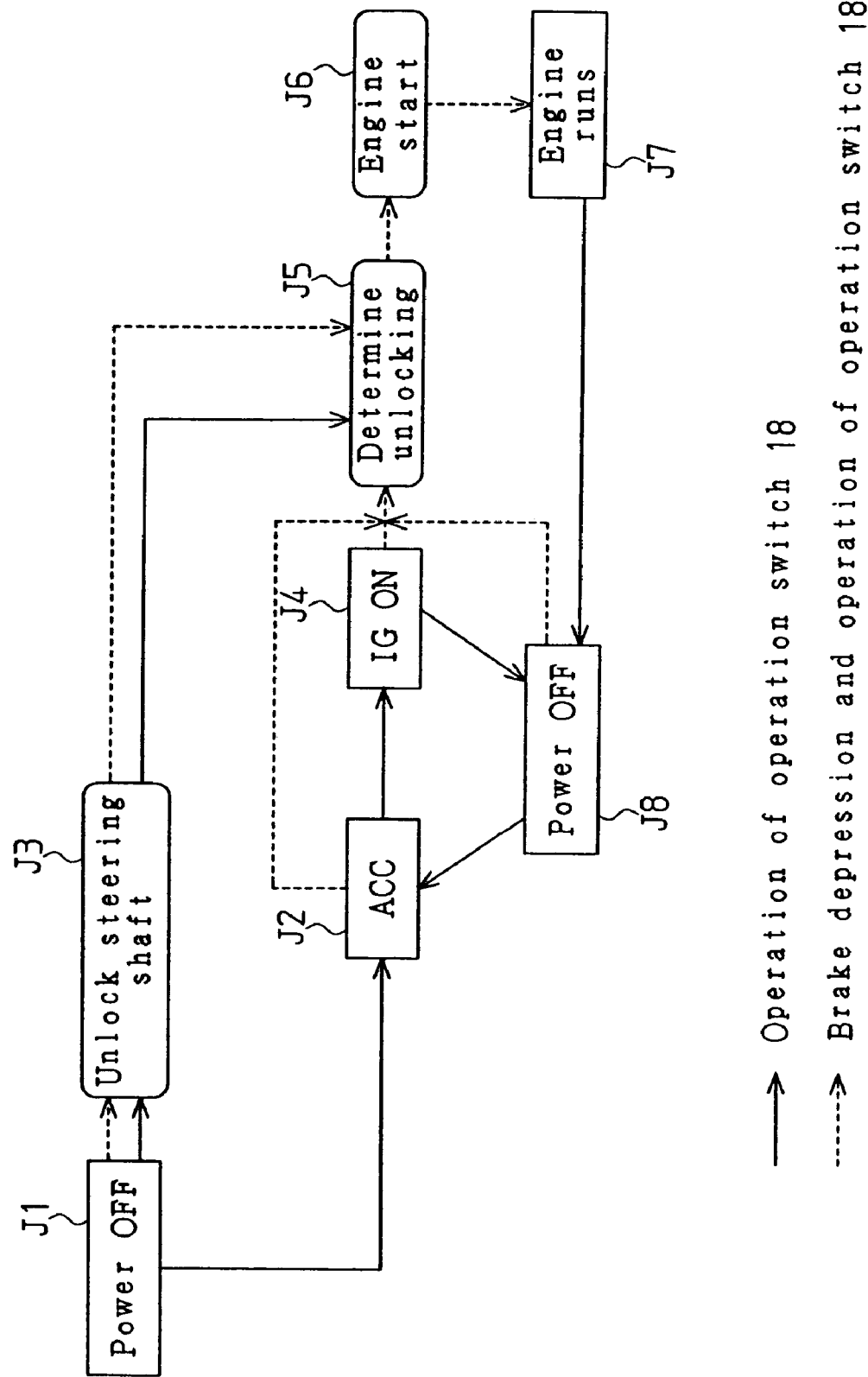
FIG. 4 is a flowchart illustrating the operation of an engine start controller shown in FIG. 2.

The following describes, in detail, a one-push engine start/stop control system 1 according to a first embodiment of the present invention, which is installed in a vehicle including an electric drive type steering lock mechanism 31, with reference to FIGS. 2 to 4.

As shown in FIG. 2, the engine start/stop control system 1 includes a portable device 11 and an engine start controller 12, which is installed in a vehicle 2.

The portable device 11 is carried by an owner (driver), and communicates with the engine start controller 12. In more detail, the engine start controller 12 transmits a request signal. When receiving the request signal from the engine start controller 12, the portable device 11 automatically transmits an ID code signal including a predetermined ID code. The ID code signal is transmitted as a radio wave having a predetermined frequency (e.g., 300 MHz).

The engine start controller 12 includes a transceiver unit 13, a verification control unit 14, a power supply control unit 15, an engine control unit 17, and an operation switch (operation unit) 18. The engine start controller 12 further includes a steering lock mechanism 31 including a lock control unit 16, a detection switch 32, and a motor 33. As described in detail later, the steering lock mechanism 31 is a mechanism for selectively locking the steering shaft 3 as shown in FIGS. 3A and 3B.

In the first embodiment, the operation switch 18 is a momentary push button switch arranged in the vicinity of the driver's seat. When pushed, the operation switch 18 provides the power supply control unit 15 with an operation signal.

Each of the control units 14 to 17 includes a CPU, a ROM, and a RAM (none shown). The transceiver unit 13 is electrically connected to the verification control unit 14. The verification control unit 14 is electrically connected to the power supply control unit 15 and the lock control unit 16 via a communication line N1. The engine control unit 17 is electrically connected to the verification control unit 14. The engine control unit 17 and the operation switch 18 are electrically connected to the power supply control unit 15.

The verification control unit 14 intermittently provides the transceiver unit 13 with a request signal. The transceiver unit 13 modulates the request signal provided from the verification control unit 14 into a radio wave having a predetermined frequency (e.g., 134 kHz) and transmits the radio wave to the passenger compartment of the vehicle. The transceiver unit 13 receives an ID code signal transmitted from the portable device 11, demodulates the ID code signal to a pulse signal, and provides the verification control unit 14 with the pulse signal (signal including an ID code of the portable device 11).

When receiving the pulse signal from the transceiver unit 13, the verification control unit 14 compares the ID code included in the pulse signal with a preset ID code (ID code verification). When the two ID codes match, the verification control unit 14 verifies that the ID of the portable device 11 corresponds to the ID of the vehicle. The verification control unit 14 recognizes that the operation switch 18 has been operated via the communication line N1. When the two ID codes match during the ID code verification, and the operation switch 18 is operated, the verification control unit 14 provides the power supply control unit 15 with an unlock standby signal via the communication line N1.

When the unlocking of the steering shaft 3 is completed, the lock control unit 16 provides the verification control unit 14 with an unlocking completion signal. In response to the unlocking completion signal provided from the lock control unit 16, the verification control unit 14 provides the power supply control unit 15 and the engine control unit 17 with a start permission signal. The power supply control unit 15 provides the verification control unit 14 with an engine drive signal when the engine of the vehicle is running. When receiving the engine drive signal from the power supply control unit 15, the verification control unit 14 stops transmitting the request signal to the transceiver unit 13.

An accessory relay (ACC relay) 19, an ignition relay (IG relay) 20, and a starter relay (ST relay) 21 are connected to the power supply control unit 15. The power supply control unit 15 provides each of the relays 19 to 21 with an actuation signal. Each of the relays 19 to 21 is actuated in response to the actuation signal from the power supply control unit 15.

A detection switch 32 is electrically connected to the power supply control unit 15. The detection switch 32 detects whether the steering shaft 3 is locked or unlocked. In the first embodiment, the detection switch 32 outputs a low (L) level signal when the steering shaft 3 is locked, and outputs a high (H) level signal when the steering shaft 3 is unlocked.

The power supply control unit 15 receives the unlock standby signal generated by the verification control unit 14 via the communication line N1. Based on the unlock standby signal, the power supply control unit 15 determines that the ID of the portable device 11 has been verified through the ID code verification. Thus, the power supply control unit 15 validates an operation signal provided from the operation switch 18. The power supply control unit 15 determines whether the operation switch 18 has been operated based on the operation signal. The power supply control unit 15 recognizes that the operation switch 18 has been operated when the operation signal is valid. Subsequently, the power supply control unit 15 provides the ACC relay 19 with an actuation signal and provides the lock control unit 16 with an unlock request signal requesting the steering shaft 3 to be unlocked. When the ACC relay 19 is actuated in response to the actuation signal, power is supplied to various electric components (e.g., car audio system) in the accessory drive system. Afterwards, when recognizing that the operation switch 18 has been further operated, the power supply control unit 15 provides the IG relay 20 with an actuation signal. When the IG relay 20 is actuated, power is supplied to, in addition to the electric components, the air conditioner and gauges in the instrument panel in the ignition drive system. Hereafter, the system to which power is supplied when only the ACC relay 19 is actuated is referred to as the "ACC system". The system to which power is supplied when the ACC relay 19 and the IG relay 20 are both actuated is referred to as the "IG-ON system". The system to which power is supplied when the ST relay 21 is actuated is referred to as the "engine control system". When none of the relays 19 to 21 is actuated, power is not supplied to any of the electric device systems. In short, the power supply control unit 15 switches the power supply mode to the ACC system power supply mode, the IG-ON system power supply mode, or the power OFF mode.

In this way, in response to the operation of the operation switch 18, the power supply control unit 15 starts the unlocking of the steering shaft 3, and at the same time, switches the power supply mode from the power OFF mode to the ACC system power supply mode (switch control). In other words, the power supply control unit 15 executes the switch control in parallel with the unlock control for unlocking the steering shaft 3.

When receiving the start permission signal from the verification control unit 14 and receiving a high signal from the detection switch 32, the power supply control unit 15 is set in an engine start permission state. In the engine start permission state, the driver depresses the brake pedal and then operates the operation switch 18. Subsequently, the power supply control unit 15 stops providing the ACC relay 19 with an actuation signal and provides the IG relay 20 and the ST relay 21 with an actuation signal. Then, the IG relay 20 and the ST relay 21 are actuated and power is supplied to the engine control unit 17. This actuates an engine starter (not shown). If the operation switch 18 is operated when the brake pedal is depressed, the power supply control unit 15 provides the engine control unit 17 with a start signal. When the driver operates the operation switch 18 without depressing the brake pedal in the engine start permission state, the power supply control unit 15 switches the power supply mode to the power OFF mode.

When receiving a start permission signal from the verification control unit 14 and receiving a start signal from the power supply control unit 15, the engine control unit 17 executes various controls such as fuel injection control and ignition control, to start the engine (start control). The engine control unit 17 detects the state of the engine based on an ignition pulse, an output from the alternator, etc. When determining that the engine is running, the engine control unit 17 provides the power supply control unit 15 with a combustion completion signal.

When receiving the combustion completion signal from the engine control unit 17, the power supply control unit 15 provides the ACC relay 19 with an actuation signal, and stops providing the ST relay 21 with an actuation signal. As a result, the ACC relay 19 is set in an actuated state, and the ST relay 21 is set in a non-actuated state.

When receiving a stop request signal requesting that the engine be stopped from the power supply control unit 15, the engine control unit 17 suspends the fuel injection control and the ignition control to stop the engine (stop control).

When the power supply control unit 15 is being provided with a combustion completion signal, that is, when the engine is running, the driver operates the operation switch 18. Then, the power supply control unit 15 provides the engine control unit 17 with a stop request signal and switches the power supply mode to the power OFF mode.

In this way, the power supply control unit 15 executes the start control or the stop control of the engine based on the operation signal output by the operation of the operation switch 18.

The lock control unit 16 forms, together with the detection switch 32 and the motor 33, the steering lock mechanism 31. The detection switch 32 and the motor 33 are electrically connected to the lock control unit 16.

As shown in FIGS. 3A and 3B, the steering lock mechanism 31 includes a lock bar 34, in addition to the lock control unit 16, the detection switch 32, and the motor 33. In the first embodiment, the detection switch 32 is preferably a normal open type (A contact) mechanical switch (limit switch). The detection switch 32 includes a first terminal connected to a battery (+B) and a second terminal connected to the power supply control unit 15 and the lock control unit 16.

The motor 33 is controlled by the lock control unit 16, and driven in response to a drive signal provided from the lock control unit 16. A worm gear 35, which is attached to a rotary shaft of the motor 33, rotates integrally with the rotary shaft. A rotatable spur gear 36 meshes with the worm gear 35.

A recess 3a is formed in an outer surface of the steering shaft 3. A first end portion of the lock bar 34 is engaged with and disengaged from the recess 3a of the steering shaft 3. When the lock bar 34 is engaged with the recess 3a (refer to FIG. 3A), the rotation of the steering shaft 3 is restricted. When the lock bar 34 is disengaged from the recess 3a (refer to FIG. 3B), the rotation of the steering shaft 3 is allowed.

A rack 34a that meshes with the spur gear 36 is formed on the outer surface of the lock bar 34. Due to the rack 34a, the lock bar 34 is movable in a direction perpendicular to the axial direction of the steering shaft 3 (the direction indicated by arrows F1 and F2 in FIGS. 3A and 3B) when the spur gear 36 is rotated. To be more specific, the lock bar 34 moves when the motor 33 is driven so that the lock bar 34 is engaged with or disengaged from the steering shaft 3.

A switch driving projection 34b is formed on a second end portion of the lock bar 34. As shown in the state of FIG. 3A, when the lock bar 34 is engaged with the recess 3a of the steering shaft 3, the steering shaft 3 is locked. In this state, the projection 34b is not in contact with the detection switch 32. Thus, when the steering shaft 3 is locked, the detection switch 32 is opened and the power supply control unit 15, and the lock control unit 16 are provided with a low signal. The power supply control unit 15 and the lock control unit 16 recognize that the steering shaft 3 is locked based on the low signal from the detection switch 32.

As shown in the state of FIG. 3B, when the lock bar 34 is disengaged from the recess 3a, the steering shaft 3 is unlocked. In this state, the projection 34b is in contact with the detection switch 32. Thus, the detection switch 32 is closed. As a result, the power supply control unit 15 and the lock control unit 16 are provided with a high signal. Based on the high signal from the detection switch 32, the power supply control unit 15 and the lock control unit 16 recognize that the steering shaft 3 is unlocked. The detection switch 32 is closed when the lock bar 34 is completely disengaged from the recess 3a of the steering shaft 3.

The lock control unit 16 receives the unlock request signal from the power supply control unit 15 via the communication line N1. In response to the unlock request signal, the lock control unit 16 provides the motor 33 with a drive signal for unlocking the steering shaft 3. Then, the motor 33 rotates its rotary shaft in the direction indicated by arrow R1 in FIG. 3A to move the lock bar 34 in the direction indicated by arrow F1 (in the direction that separates the lock bar 34 from the steering shaft 3). This disengages the lock bar 34 from the recess 3a of the steering shaft 3 and closes the detection switch 32, as shown in the state of FIG. 3B. Then, in response to the high signal from the detection switch 32, the lock control unit 16 provides the verification control unit 14 with the unlocking completion signal.

The lock control unit 16 receives various signals including a control signal transmitted from the power supply control unit 15 and an output signal transmitted from a door courtesy light switch. When these signals satisfy a predetermined condition, the lock control unit 16 provides the motor 33 with a drive signal for locking the steering shaft 3. The motor 33 then rotates its rotary shaft in the direction indicated by arrow R2 in FIG. 3B. This moves the lock bar 34 in the direction indicated by arrow F2 (in the direction that moves the lock bar 34 toward the steering shaft 3). This engages the lock bar 34 with the recess 3a of the steering shaft 3 and opens the detection switch 32 as shown in FIG. 3A.

The following describes the procedures performed by the engine start/stop control system 1 when the driver operates the operation switch 18 to switch the power supply mode and start the engine. In FIG. 4, the rectangular blocks represent processes that require an operation of the driver to proceed to the next process. The rectangular blocks with rounded corners represent processes that do not require an operation of the driver to proceed to the next process.

In step J1, power is not supplied to the electric device systems (power OFF mode). In step J1, the engine start controller 12 is set in a standby state when the ID of the portable device 11 is authenticated by the ID code verification. The driver operates the operation switch 18 in the standby state. Then, the power supply mode is switched from the power OFF mode (step J1) to the ACC system power supply mode as shown in step J2. At the same time, the steering shaft 3 is unlocked as shown in step J3.

When the driver further operates the operation switch 18, the power supply mode is switched from the ACC system power supply mode to the IG-ON system power supply mode as shown in step J4. In step J4, the driver depresses the brake pedal and operates the operation switch 18. Then, as shown in step J5, the engine start controller 12 determines whether the steering shaft 3 is unlocked. When the steering shaft 3 is unlocked in step J5, the engine is started as shown in step J6. Thus, the engine starts running (step J7).

When the driver operates the operation switch 18 without depressing the brake pedal in step J4, the power supply mode is switched to the power OFF mode (step J8). The power supply mode is sequentially switched to the ACC system power supply mode (step J2), the IG-ON system power supply mode (step J4), and the power OFF mode (step J8) each time the driver operates the operation switch 18 without depressing the brake pedal. In other words, when the driver operates the operation switch 18 without depressing the brake pedal, the engine start controller 12 is switched to the state of one of steps J2, J4, and J8. Thus, the driver needs to depress the brake pedal to start the engine.

In the power OFF mode shown in step J1, the driver depresses the brake pedal and operates the operation switch 18. Then, the engine start controller 12 unlocks the steering shaft 3. Afterwards, the engine start controller 12 actuates the engine without executing the processes of steps J2 (the ACC system power supply mode) and J4 (the IG-ON system power supply mode). In any of steps J2 (the ACC system power supply mode), J4 (the IG-ON system power supply mode), and J8 (power OFF mode), the engine is started if the driver depresses the brake pedal and operates the operation switch 18 when the steering shaft 3 is unlocked.

The driver operates the operation switch 18 when the engine is running. This stops the engine and switches the power supply mode to the power OFF mode shown in step J8. If the driver opens and closes a door to exit the vehicle while the shift lever is at the parking (P) position, the engine start controller 12 locks the steering shaft 3.

The engine start controller 12 of the first embodiment has the advantages described below.

The power supply control unit 15 executes the unlock control for unlocking the steering shaft 3 in parallel with the switch control for switching the power supply mode. To be more specific, when the driver operates the operation switch 18, the power supply mode is switched from the power OFF mode to the ACC system power supply mode, and at the same time, the unlocking of the steering shaft 3 is started. In this way, the power supply mode is switched to the ACC system power supply mode before the unlocking of the steering shaft 3 is completed. This shortens the time required from when the driver operates the operation switch 18 to when the engine is started.

The power supply mode is switched to the ACC system power supply mode within a short time after the operation switch 18 is operated compared with the prior art. Thus, for example, the driver can operate a car audio system immediately after operating the operation switch 18. This improves the convenience of the vehicle 2.

Second Embodiment

An engine start controller 41 according to a second embodiment of the present invention will now be described with reference to FIGS. 5 to 7.

Figure 5:
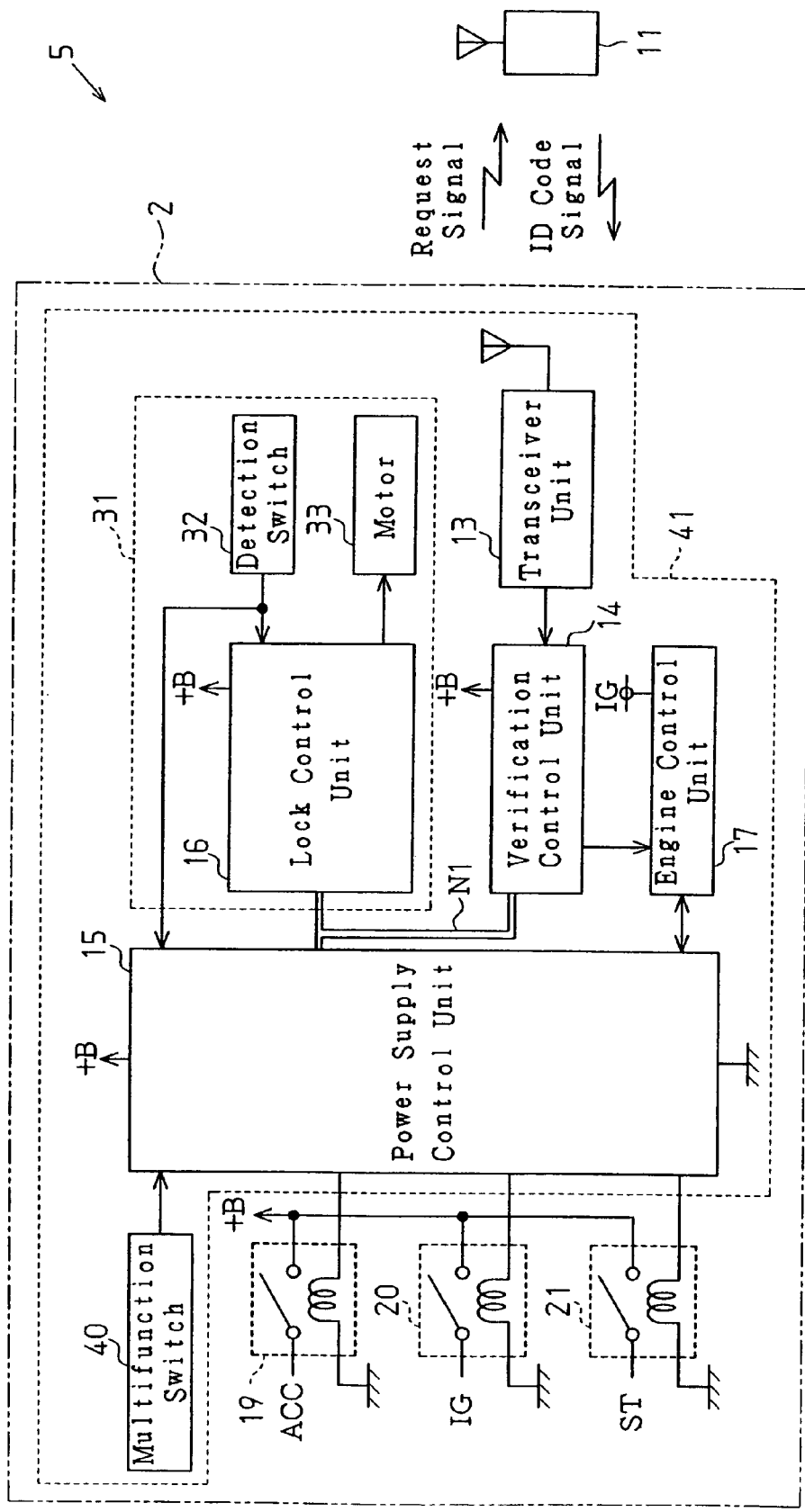
FIG. 5 is a schematic block diagram of an engine start/stop control system according to a second embodiment of the present invention.

As shown in FIG. 5, the engine start controller 41 of the second embodiment includes a multifunction switch 40 (operation unit) in lieu of the operation switch 18 in the first embodiment. The multifunction switch 40 is electrically connected to the power supply control unit 15.

As shown in FIGS. 6A to 6F, the multifunction switch 40 includes a switch body 40b and an operation knob (operation portion) 40a, which is arranged in the middle of the switch body 40b. Anti-slip serrations are formed along the peripheral surface of the operation knob 40a. The operation knob 40a is projected from the switch body 40b. Symbols "ACC" and "IG", which indicate power supply modes, are marked on the surface 40c of the switch body 40b.

Figure 6A:
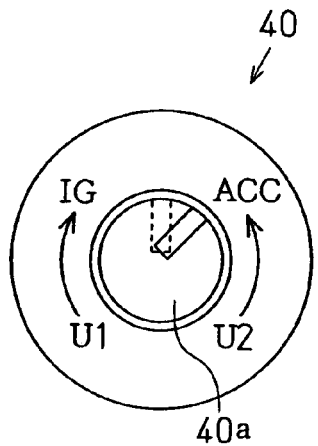
FIGS. 6A to 6F are diagrams illustrating the operation of a multifunction switch shown in FIG. 5.
Figure 6B:
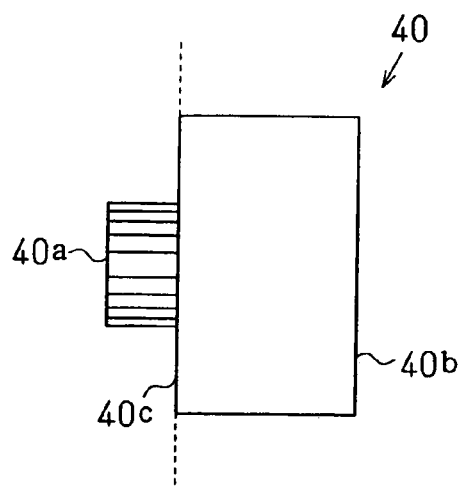
Figure 6C:
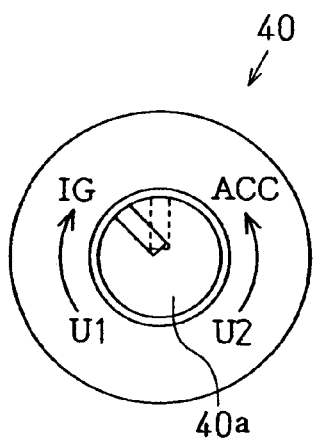

The operation knob 40a of the multifunction switch 40 is pushed and turned by the driver. As shown in FIG. 6F, when the driver pushes the operation knob 40a, the operation knob 40a is forced into the switch body 40b. In this state, the multifunction switch 40 outputs a first operation signal. As shown in FIG. 6A, when the driver turns the operation knob 40a in the direction indicated by arrow U1 (clockwise), the operation knob 40a is moved to the ACC position. In this state, the multifunction switch 40 outputs a second operation signal. As shown in FIG. 6C, when the driver turns the operation knob 40a in the direction indicated by arrow U2 (counterclockwise), the operation knob 40a is moved to the IG position. In this state, the multifunction switch 40 outputs a third operation signal.

In the second embodiment, the multifunction switch 40 is a momentary switch. In more detail, when the driver who is pushing the operation knob 40a releases the operation knob 40a, the operation knob 40a automatically returns to the position it was located prior to being pushed. Further, when the driver who is turning the operation knob 40a in the direction of arrow U1 or the direction of arrow U2 releases the operation knob 40a, the operation knob 40a automatically returns to the position it was located prior to being turned.

When receiving the unlock standby signal via the communication line N1, the power supply control unit 15 determines that the ID of the portable device 11 has been authenticated by the ID code verification and validates the first to third operation signals provided from the multifunction switch 40. The power supply control unit 15 recognizes that the operation knob 40a of the multifunction switch 40 has been turned in the direction of arrow U1 based on the second operation signal when the first to third operation signals are valid. Then, the power supply control unit 15 provides the ACC relay 19 with an actuation signal (switch control), and at the same time, executes the unlock control. When recognizing that the operation knob 40a has been turned in the direction of arrow U2 based on the third operation signal, the power supply control unit 15 outputs an actuation signal to the IG relay 20 (switch control), and at the same time, executes the unlock control.

In this way, when the operation knob 40a of the multifunction switch 40 is turned, the power supply control unit 15 starts unlocking of the steering shaft 3, and at the same time, switches the power supply mode from the power OFF mode to the ACC system power supply mode or the IG-ON system power supply mode. In other words, the power supply control unit 15 executes the switch control and the unlock control in parallel.

In the engine start permission state, the driver pushes the operation knob 40a after depressing the brake pedal. When recognizing that the brake pedal has been depressed and the operation knob 40a has been pushed, the power supply control unit 15 stops providing the ACC relay 19 with an actuation signal, and provides the IG relay 20 and the ST relay 21 with an actuation signal. If the operation knob 40a is pushed when the brake pedal is depressed, the power supply control unit 15 provides the engine control unit 17 with a start signal.

In the engine start permission state, when the driver pushes the operation knob 40a without depressing the brake pedal, the power supply control unit 15 switches the power supply mode to the power OFF mode. Further, if the driver pushes the operation knob 40a when the power supply control unit 15 has been provided with the combustion completion signal, the power supply control unit 15 provides the engine control unit 17 with a stop request signal and switches the power supply mode to the power OFF mode.

The following describes the procedures performed by the engine start/stop control system 5 when the multifunction switch 40 is operated by the driver, the power supply mode is switched, and the engine is started. In FIG. 7, the rectangular blocks represent processes that require an operation of the driver to proceed to the next process. The rectangular blocks with rounded corners represent processes that do not require an operation of the driver to proceed to the next process.

In step J10, power is not supplied to the electric device systems (power OFF mode). In step J10, the engine start controller 41 is set in a standby state when the ID of the portable device 11 is authenticated by the ID code verification. In the standby state, the driver turns the operation knob 40a of the multifunction switch 40 in the direction of arrow U1 as shown in FIGS. 6A and 6B. Then, the engine start controller 41 switches the power supply mode from the power OFF mode to the ACC system power supply mode shown in step J11, and at the same time, unlocks the steering shaft 3 as shown in step J12.

When the driver releases the operation knob 40a, the operation knob 40a is turned in the direction of arrow U2, and is stopped at the position indicated by the broken lines in FIG. 6A.

Figure 6D:
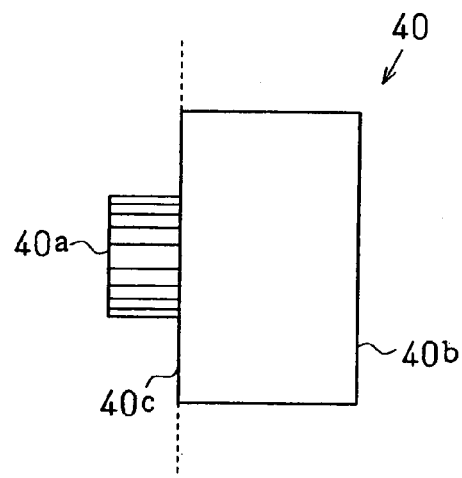

When the driver turns the operation knob 40a of the multifunction switch 40 in the direction of arrow U2 as shown in the states of FIGS. 6C and 6D, the engine start controller 41 switches the power supply mode from the power OFF mode to the IG-ON system power supply mode shown in step J13, and at the same time, unlocks the steering shaft 3 as shown in step J12. When the driver releases the operation knob 40a, the operation knob 40a is turned in the direction of arrow U1, and is stopped at the position indicated by the broken lines in FIG. 6C.

In this manner, the power supply mode is switched to the ACC system power supply mode when the driver turns the operation knob 40a in the direction of arrow U1. When the driver turns the operation knob 40a in the direction of arrow U2, the power supply mode is switched to the IG-ON system power supply mode. Afterwards, when the driver releases the operation knob 40a, the operation knob 40a is turned in the direction of arrow U1 or U2, and is stopped at the position indicated by the broken lines in FIG. 6A or 6C.

The driver depresses the brake pedal and pushes the operation knob 40a when the power supply mode has been switched to the ACC system power supply mode or to the IG-ON system power supply mode. Then, the engine start controller 41 determines whether the steering shaft 3 is unlocked as shown in step J14. When the steering shaft 3 is unlocked, the engine is started as shown in step J15. Thus, the engine starts to run (step J16).

If the driver pushes the operation knob 40a without depressing the brake pedal when the power supply mode has been switched to the ACC system power supply mode or to the IG-ON system power supply mode, the engine start controller 41 switches the power supply mode to the power OFF mode as shown in step J17. When the driver turns the operation knob 40a in the direction of arrow U1 in step J17, the engine start controller 41 switches the power supply mode to the ACC system power supply mode. When the driver turns the operation knob 40a in the direction of arrow U2, the power supply control unit 15 of the engine start controller 41 switches the power supply mode to the IG-ON system power supply mode.

Figure 6E:
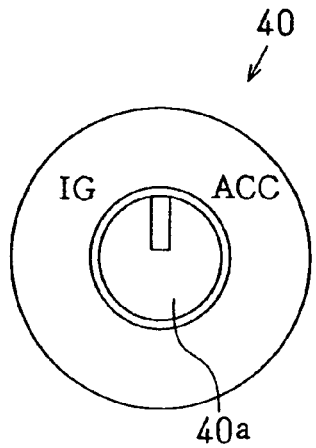
Figure 6F:
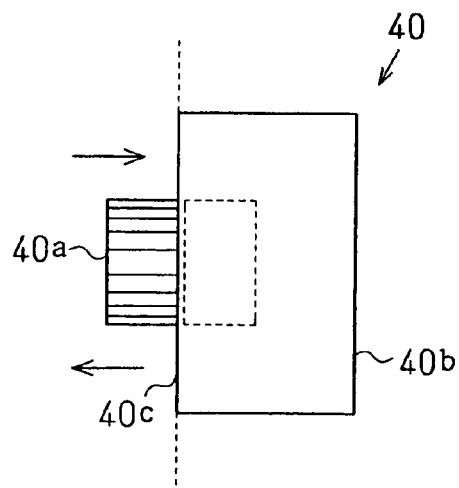

In step J10 (power OFF mode), when the driver depresses the brake pedal and pushes the operation knob 40a as shown in FIGS. 6E and 6F, the engine start controller 41 unlocks the steering shaft 3. Afterwards, the engine start controller 41 starts the engine. In this state, the operation knob 40a is forced into the switch body 40b as indicated by a broken line in FIG. 6F. When the driver releases the operation knob 40a, the operation knob 40a is projected from the switch body 40b and returned to the position it was located prior to being pushed.

In the same manner, when the driver depresses the brake pedal and pushes the operation knob 40a in step J17 (power OFF mode), the engine is started. If the driver pushes the operation knob 40a when the engine is running, as shown in step J16, the power supply control unit 15 of the engine start controller 41 stops the engine and switches the power supply mode to the power OFF mode shown in step J17.

The engine start controller 41 of the second embodiment has the advantages described below in addition to the advantages of the first embodiment.

When the driver turns the operation knob 40a in the direction of arrow U1, the power supply mode is switched to the ACC system power supply mode (step J11). When the driver turns the operation knob 40a in the direction of arrow U2, the power supply mode is switched to the IG-ON system power supply mode (step J13). When the driver depresses the brake pedal and pushes the operation knob 40a, the engine is started. In this way, after the ID of the portable device 11 is authenticated by the ID code verification, the driver switches the power supply mode from the power OFF mode to the ACC system power supply mode or to the IG-ON system power supply mode simply by operating the operation knob 40a once. Thus, the driver does not need to pay attention to the order in which the power supply modes are switched. This improves the convenience of the engine start controller 41.

When the driver turns the operation knob 40a in the direction of arrow U2, the power supply mode is switched to the IG-ON system power supply mode (step J13). Thus, for example, the driver may actuate the air conditioner or check gauges (e.g., check the remaining amount of fuel) immediately after operating the operation knob 40a.

It should be apparent to those skilled in the art that the present invention may be embodied in many other specific forms without departing from the spirit or scope of the invention. Particularly, it should be understood that the present invention may be embodied in the following forms.

In the first embodiment, after the power supply mode is set in the IG-ON system power supply mode, the power supply control unit 15 determines whether the steering shaft 3 is unlocked when the brake pedal is depressed during operation of the operation switch 18. The engine is started when the steering shaft 3 is unlocked. However, the power supply control unit 15 may determine whether the steering shaft 3 is unlocked when the power supply mode is switched from the ACC system power supply mode to the IG-ON system power supply mode. In this case, the power supply control unit 15 switches the power supply mode from the ACC system power supply mode to the IG-ON system power supply mode when the steering shaft 3 is unlocked.

The present examples and embodiments are to be considered as illustrative and not restrictive, and the invention is not to be limited to the details given herein, but may be modified within the scope and equivalence of the appended claims.

What is claimed is:

1. A controller for controlling starting of an engine of a vehicle, including a steering shaft, by a user having a portable device, and for controlling power supply to a plurality of electric device systems, the controller comprising:

a control unit for selectively locking the steering shaft of the vehicle and performing authentication with the portable device to permit use of the vehicle, the portable device being carried by the user of the vehicle; and an operation unit, connected to the control unit, for generating an operation signal when operated by the user, wherein the control unit generates an unlock request signal for unlocking the steering shaft and an actuation signal for selectively providing power to the plurality of electric device systems at substantially the same time, wherein the control unit unlocks the steering shaft in parallel with selectively supplying power to the plurality of electric device systems using the unlock request signal and the actuation signal when the operation signal is generated and use of the vehicle is permitted through the authentication.

2. The controller according to claim 1, wherein:

the plurality of electric device systems include a first electric device system and a second electric device system;

the operation unit is operable by the user in a plurality of modes including first, second, and third modes, the operation unit generating a first operation signal when operated in the first mode, a second operation signal when operated in the second mode, and a third operation signal when operated in the third mode; and the control unit stops or starts the engine in response to the first operation signal, supplies power to the first electric device system in response to the second operation signal, and supplies power to the second electric device system in response to the third operation signal.

3. The controller according to claim 2, wherein:

the first electric device system is an accessory system and the second electric device system is an ignition-on system;

the operation unit includes an operation portion that is pushed and turned in a first direction and a second direction; and the control unit generates the first operation signal when the operation portion is pushed, generates the second operation signal when the operation portion is turned in the first direction, and generates the third operation signal when the operation portion is turned in the second direction.

4. The controller according to claim 1, wherein the plurality of electric device systems include an accessory system, and the control unit supplies power to the accessory system when the operation unit is operated in a state in which use of the vehicle is permitted.

5. The controller according to claim 4, wherein the plurality of electric device systems further include an ignition-on system, and the control unit supplies power to the ignition-on system when the operation unit is operated in a state in which power is supplied to the accessory system.

6. The controller according to claim 5, wherein the control unit supplies power to the ignition-on system when the operation unit is operated in a state in which power is supplied to the accessory system and the steering shaft is unlocked.

7. A controller for controlling starting of an engine of a vehicle, including a steering shaft, by a user having a portable device, and for controlling power supply to a plurality of electric device systems, the controller comprising:

a lock mechanism for selectively locking the steering shaft of the vehicle;

an authentication unit for performing authentication with the portable device to permit use of the vehicle, the portable device being carried by the user of the vehicle;

an operation unit for generating an operation signal when operated by the user; and a power supply control unit connected to the lock mechanism, the authentication unit, and the operation unit, wherein the power supply control unit generates an unlock request signal for unlocking the steering shaft and an actuation signal for selectively providing power to the plurality of electric device systems at substantially the same time, wherein the control unit controls the lock mechanism to unlock the steering shaft in parallel with selectively supplying power to the plurality of electric device systems using the unlock request signal and the actuation signal when the operation signal is generated and use of the vehicle is permitted through the authentication.

8. A method for controlling starting of an engine of a vehicle that communicates with a portable device, wherein the vehicle includes a steering shaft that is selectively locked, a plurality of electric device systems, and an operation unit that is operable by a user, the method comprising:

performing authentication for permitting use of the vehicle through communication between the portable device and the vehicle;

generating an unlock request signal for unlocking the steering shaft and an actuation signal for selectively supplying power to the plurality of electric device systems; and unlocking the steering shaft in parallel with selectively supplying power to the electric device system when the user operates the operation unit if use of the vehicle is permitted by said performing authentication for permitting use of the vehicle.

9. The method according to claim 8, wherein the plurality of electric device systems include an accessory system and an ignition-on system, and said supplying power to the electric device system includes supplying power to the accessory system, the method further comprising:

supplying power to the ignition-on system when the user operates the operation unit in a state in which power is supplied to the accessory system.

10. A method for controlling starting of an engine of a vehicle that communicates with a portable device, wherein the vehicle includes a steering shaft that is selectively locked, a plurality of electric device systems including a first electric device system, a second electric device system, and an engine control system, and an operation unit that includes an operation portion pushed and turned in a first direction and a second direction, and that is operable by a user in a plurality of modes including a first mode, a second mode, and a third mode, the method comprising:

performing authentication for permitting use of the vehicle through communication between the portable device and the vehicle;

generating an unlock request signal for unlocking the steering shaft and a first actuation signal for supplying power to the first electric device system at substantially the same time;

unlocking the steering shaft in parallel with supplying power to the first electric device system using the unlock request signal and the first actuation signal when the user operates the operation unit in the first mode by turning the operation portion in the first direction if use of the vehicle is permitted by said performing authentication for permitting use of the vehicle;

generating an unlock request signal for unlocking the steering shaft and a second actuation signal for supplying power to the second electric device at substantially the same time;

unlocking the steering shaft in parallel with supplying power to the second electric device system using the unlock request signal and the second actuation signal when the user operates the operation unit in the second mode by turning the operation portion in the second direction if use of the vehicle is permitted by said performing authentication for permitting use of the vehicle;

generating an unlock request signal for unlocking the steering shaft and a third actuation signal for supplying power to the engine control system at substantially the same time; and unlocking the steering shaft in parallel with supplying power to the engine control system using the unlock request signal and the third actuation signal when the user operates the operation unit in the third mode by pushing the operation portion if use of the vehicle is permitted by said performing authentication for permitting use of the vehicle.

11. The method according to claim 10, wherein the first electric device system is an accessory system, and the second electric device system is an ignition-on system.

12. The method according to claim 10, wherein:
- the operation unit includes an operation portion pushed and turned in a first direction and a second direction, and
- the user operating the operation unit in the first mode includes the user turning the operation portion in the first direction;
- the user operating the operation unit in the second mode includes the user turning the operation portion in the second direction; and
- the user operating the operation unit in the third mode includes the user pushing the operation portion.

* * * * *